(12) United States Patent
Kotrla et al.

(10) Patent No.: US 8,873,949 B2
(45) Date of Patent: Oct. 28, 2014

(54) BIT ERROR GENERATION SYSTEM FOR OPTICAL NETWORKS

(71) Applicant: Verizon Patent and Licensing Inc., Basking Ridge, NJ (US)

(72) Inventors: Scott R. Kotrla, Wylie, TX (US); Matthew W. Turlington, Richardson, TX (US); Michael U. Bencheck, Richardson, TX (US); Tiejun J. Xia, Richardson, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 13/933,199

(22) Filed: Jul. 2, 2013

(65) Prior Publication Data

US 2013/0294769 A1   Nov. 7, 2013

Related U.S. Application Data

(62) Division of application No. 12/772,315, filed on May 3, 2010, now Pat. No. 8,488,962.

(51) Int. Cl.
*H04B 10/00* (2013.01)

(52) U.S. Cl.
USPC .......................................................... 398/27

(58) Field of Classification Search
USPC ............................................................ 398/27
See application file for complete search history.

(56) References Cited

U.S. PATENT DOCUMENTS

| | | | |
|---|---|---|---|
| 5,870,211 A * | 2/1999 | Yoshida | 398/27 |
| 6,229,631 B1 | 5/2001 | Sato et al. | |
| 7,835,643 B2 | 11/2010 | Futami et al. | |
| 2002/0109879 A1 | 8/2002 | Wing So | |
| 2007/0122148 A1 | 5/2007 | Welch et al. | |
| 2009/0202248 A1* | 8/2009 | Zhang et al. | 398/81 |
| 2010/0074614 A1 | 3/2010 | Delew et al. | |

* cited by examiner

*Primary Examiner* — Danny Leung

(57) ABSTRACT

A bit error generating device includes a light source, an input device, and a control processor. The control processor includes logic configured to: receive protocol or bitrate information regarding a live traffic signal via the input device; determine bit error simulation signal parameters based on the received protocol or bitrate information; configure the light source to generate the bit error simulation signal based on the bit error simulation signal parameters; and instruct the light source to inject the bit error simulation signal into an optical fiber carrying the live traffic signal.

20 Claims, 5 Drawing Sheets

BIT ERROR GENERATION SYSTEM FOR OPTICAL NETWORKS

CROSS-REFERENCE TO RELATED APPLICATION

This application is a divisional of U.S. patent application Ser. No. 12/772,315 filed May 3, 2010, the disclosure of which is hereby incorporated herein in its entirety.

BACKGROUND INFORMATION

Optical data networks are increasingly being used for a variety of implementations, such as Ultra Long Haul (ULH) networks, Metro networks, and local access networks (e.g., Verizon FiOS™). With these increased uses, it is becoming increasingly important to ensure that provisioned equipment meets the requirements and expectations for each particular use. More specifically, many different data delivery protocols may be affected by bit errors or bit error rates in their data signals. Known systems for testing the effect of bit errors on data networks have involved expensive, protocol and/or bitrate specific devices that process data to introduce simulated bit errors into a data stream.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Embodiments described herein relate to determining how a network or network device responds to bit errors in a data signal by introducing known bit errors or bit error rates to the network or device under test. The phrase "bit error" relays to a bit in a data stream transmitted over a communication channel that has been altered by noise or otherwise damaged during transmission or processing. The phrase "bit error rate (BER)" refers to the ratio of error-bits received to the total number of bits transmitted. BER is typically expressed as a negative power of ten. For example, a BER of 1.0E-10 (i.e., $1 \times 10^{-10}$) equates to one errored bit out of every ten billion bits and a BER of 1.0E-3 equates to one errored bit out of every one thousand bits.

As described in detail below, in one exemplary implementation, bit errors may be simulated by injecting or otherwise inserting short bursts of high instantaneous power (e.g., laser) light into a data stream transmitted through a device, network, or system under test OUT). Particular BERs may be simulated by setting the frequency and length of each burst. For example, a bit error injection system may be configured based on a protocol and bitrate of an underlying data stream to simulate a desired BER. Although tight source is capable of high instantaneous power, because it may be inactive not outputting light) a majority of the time, the average power of the light source may still be relatively low.

Figure 1:
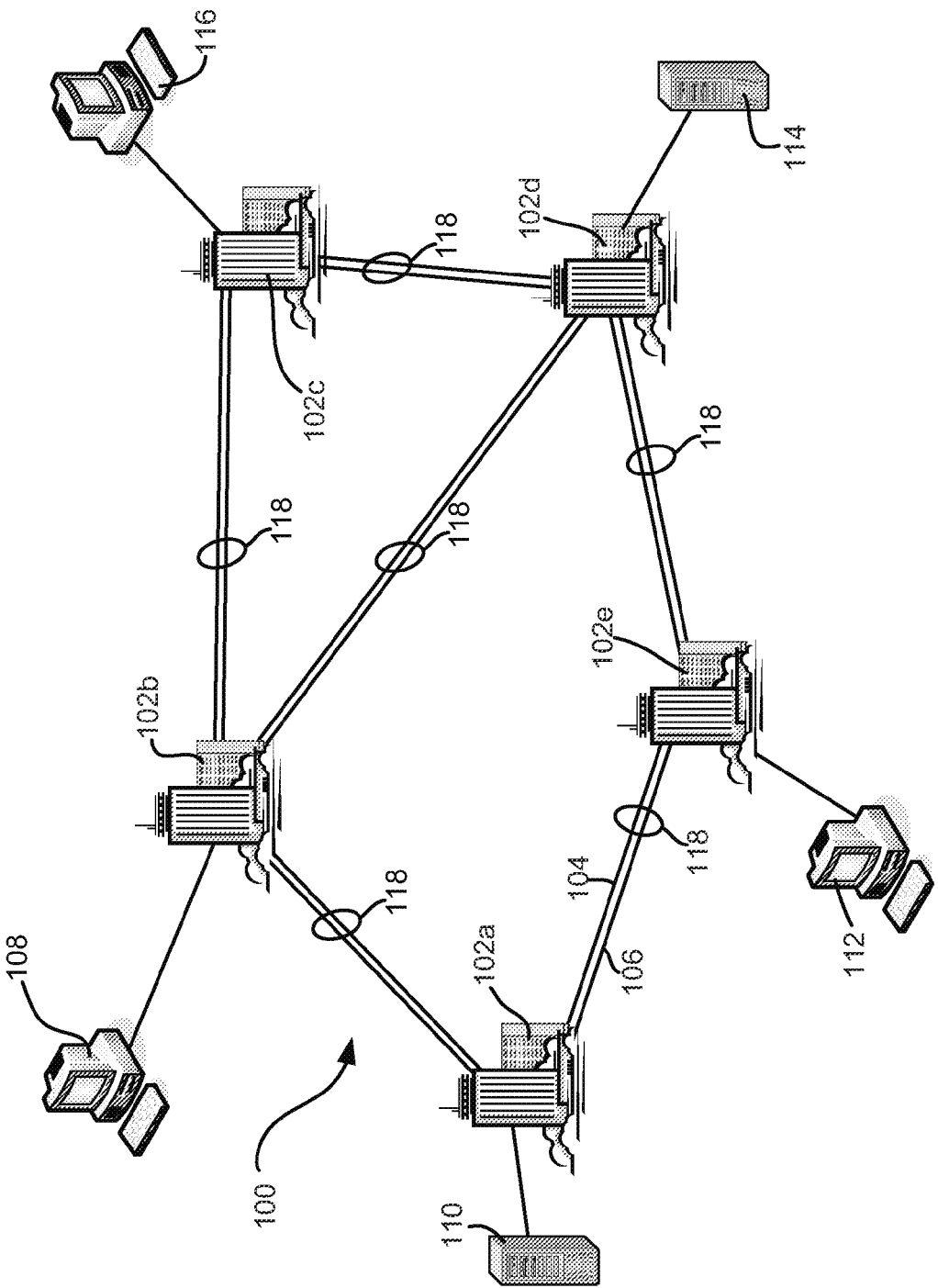
FIG. 1 illustrates an exemplary network in which systems and methods described herein may be implemented.

FIG. 1 is a block diagram illustrating an exemplary communications system 100 in which systems and methods described herein may be implemented. Communications system 100 may include multiple sites 102a, 102b, 102c, 102d, and 102e connected together by links 104 and 106. Links 104 and 106 my be implemented using electrical cables, satellites, radio or microwave signals, or optical connections and can stretch for tens or hundreds of miles between sites. Through these links, the communications system 100 may carry data signals among the sites 102a-102e to effectively interconnect data equipment 1108, 110, 112, 114, and 116 (e.g., computers, remote terminals, servers, etc.). In the case of fiber optic links, each link (e.g., links 104 and 106) may be configured to provide a number of high speed (e.g., 10 gigabits per second (Gbps)) connections using known wavelength division multiplexing (WDM) techniques.

In some implementations, links 104 and 106 may be bidirectional links, with each link providing one or more channels in opposite directions simultaneously. Alternatively, links 104 and 106 may be unidirectional links, each providing channels in directions opposite to each other. One or more links 104 and 106 that connect two sites may be collectively referred to as a "span 118." Each span 118 may include multiple fiber segments coupled together by elements such as optical amplifiers, add/drop multiplexers for adding a channel to a link, etc.

Figure 2:
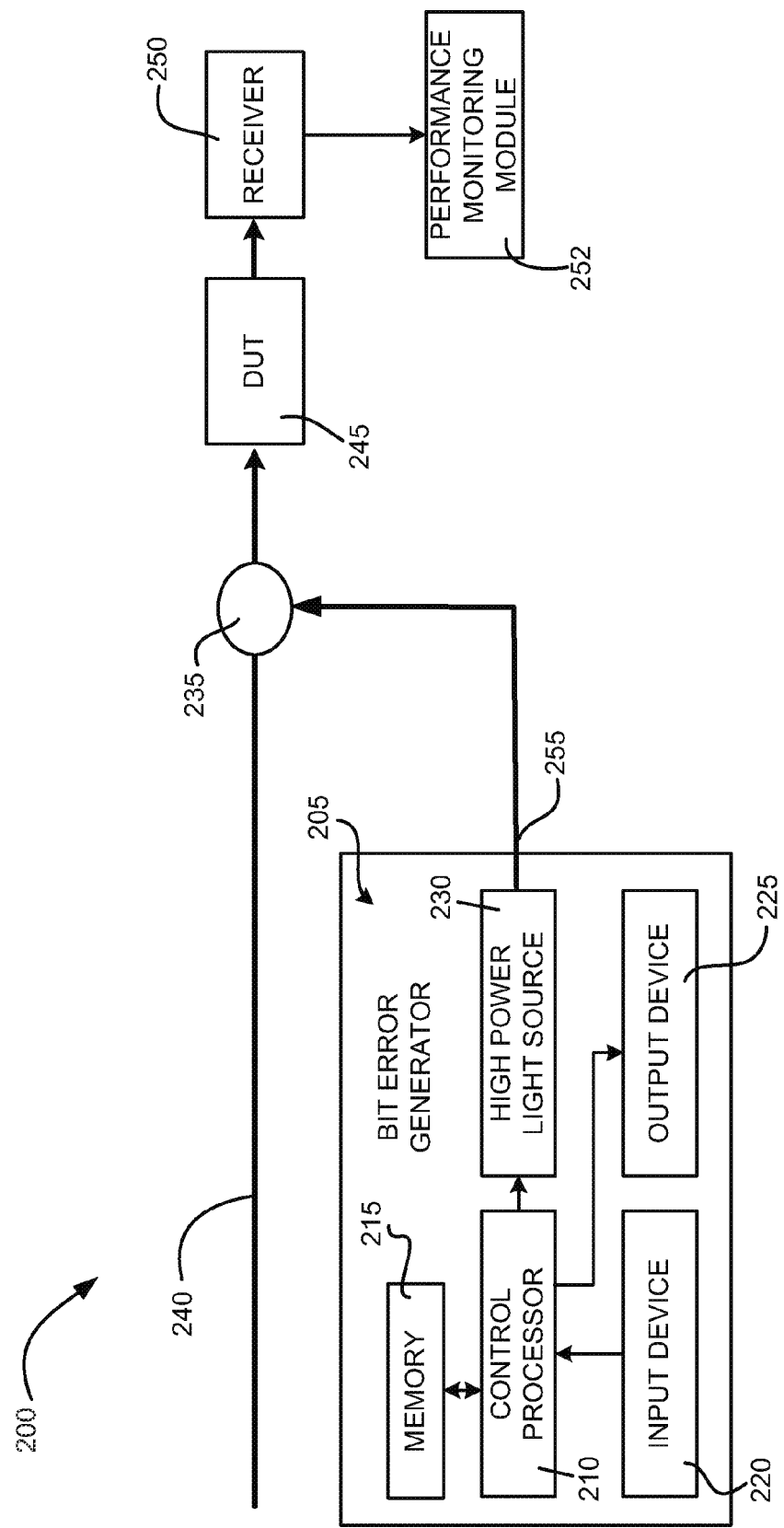
FIG. 2 is a block diagram of an exemplary configuration of a bit error simulation system consistent with implementations described here.

FIG. 2 is a block diagram of an exemplary configuration of a BER simulation system 200. As shown, BER simulation system 200 may include a bit error generator 205 that includes a control processor 210, a memory 215, an input device 220, an output device 225, and a high instantaneous power light source 230. As shown, BER simulation system 200 may further include an optical coupler 235, a live traffic link 240, a network/device under test (DUT) 245, a receiver 250, and a performance monitoring module 252, and output signal 255. The configuration illustrated in FIG. 2 is provided for simplicity. In other implementations, more, fewer, or different arrangement of components may be included in BER simulation system 200. For example, one or more power supplies, or other components may be included in BER simulation system 200.

Control processor 210 may include an embedded microprocessor, computer, workstation, or other type of processor for controlling the operation of bit error generator 205. In one implementation, control processor 210 may be configured to receive a user selection corresponding to an underlying network protocol and/or bitrate being tested. Exemplary network protocols and bitrates include gigabit Ethernet (GE), 10 gigabit Ethernet (10GE), optical transport unit-2 extended (OTU2e), optical carrier (OC)-48, 192, and 768, etc. Exemplary bitrates may range from 1.25 Gbps to 11.09 Gbps depending on the selected protocol.

In addition, to a user selection of protocol and/or bitrate, control processor 210 may be further configured to receive a user selection of a BER to simulate/generate and inject into live traffic link 240. Although any desired BERs may be simulated, exemplary rates may include 1.0E-2, 1.0E-4, 1.0E-5, and 1.0E-7.

Input device 220 may include a device or combination of devices that permits a user to input information to bit error generator 205, such as a keypad, one or more dials, a keyboard, a mouse, a pen, a microphone, etc. Input device 220 may be used in combination with output device 225 to facilitate entry of a desired wavelength value. For example, input device 220 may include a knob having a number of predefined wavelength settings. User selection of one of the predetermined settings may include turning the knob to one of the predefined wavelength settings. In some implementations (not shown), bit error generator 205 may include network interface logic configured to provide network connectivity to control processor 210 to allow, for example, configuration and use of BER simulation system 200 via a network device remote from bit error generator 205, such as a device in proximity to DUT 245 and/or receiver 250. Exemplary network interfaces may include Ethernet, 802.11x wireless, etc.

Figure 3:
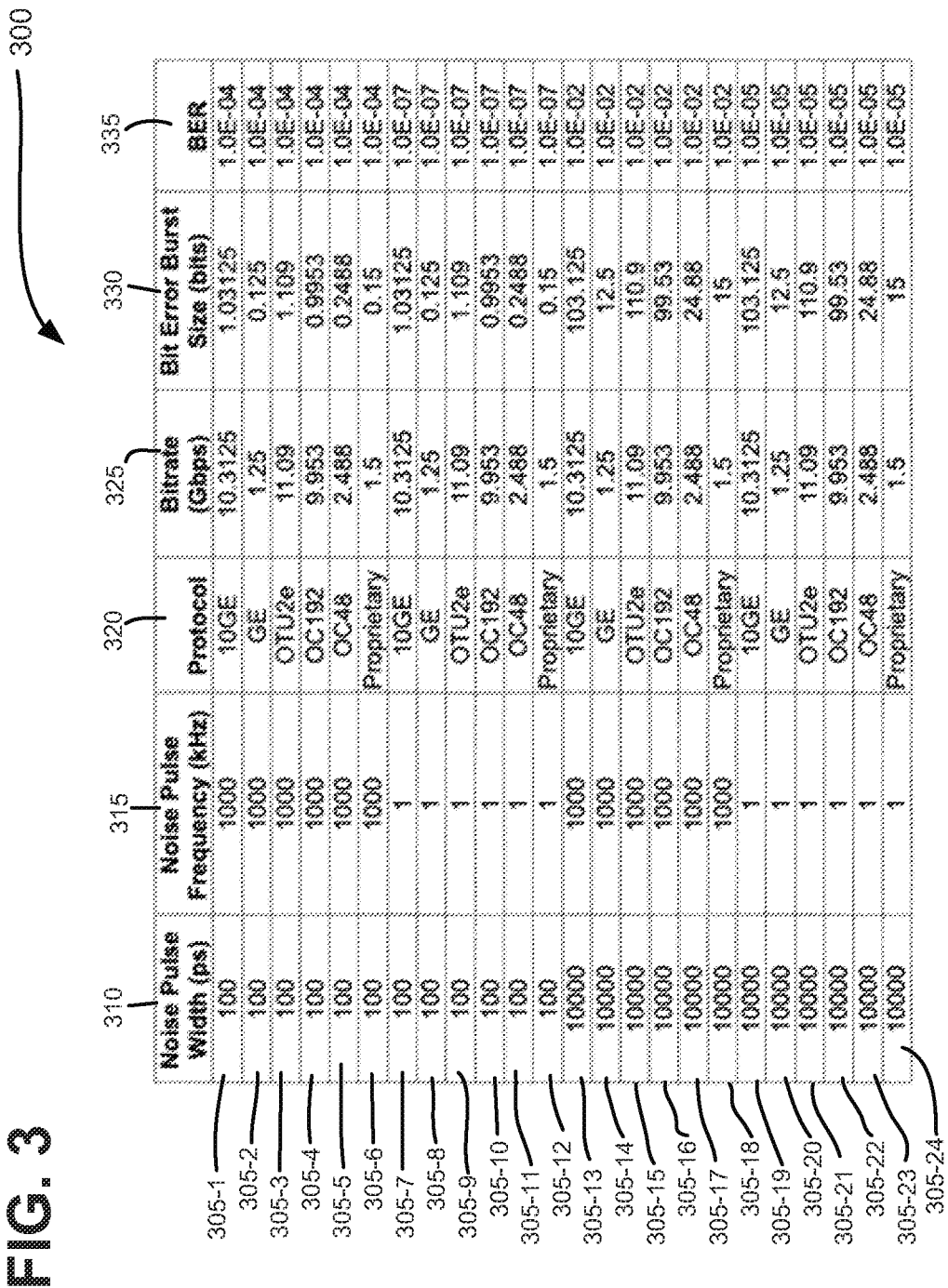
FIG. 3 is an exemplary implementation of a bit error generation table stored in the memory of FIG. 2.

Memory 215 may include bit error generation information used to generate/simulate the desired BER in live traffic link 240 based on the user-received protocol and BER information. FIG. 3 is one exemplary implementation of a bit error generation table 300 (also referred to as bit error generation lookup table stored in memory 215. Bit error generation table 300 may include bit error generation information for a number of protocols and BERs as well as corresponding light source pulse widths and pulse frequencies required to generate the BERs for each respective protocol.

For example, as shown, bit error generation table 300 may include a number of entries 305-1 to 305-24 (collectively referred to as "entries 305" and individually as "entry 305"), each corresponding to a particular BER and protocol. Each entry 305 may include a noise pulse width field 310, a noise pulse frequency field 315, a protocol field 320, a bitrate field 325, a bit error burst size field 330, and a BER field 335.

Noise pulse width field 310 may include a value corresponding to a duration of a light pulse from high instantaneous power light source 230 necessary to generate a particular bit error size. For example, entry 305-1 indicates that a 100 picosecond (ps) light pulse injected into a 10GE traffic (field 320) generates interference for 1.03 bit times, which may cause errors in 0-2 bits, depending on the bit value that is replaced by the pulse (a bit value of 1 may still be received as a 1 if the noise creates all 1s) and whether or not the original bit and the interference are in phase (if out of phase, two bits could be impacted), as indicated in bit error burst size field 330 in entry 305-1.

Noise pulse frequency field 315 may include a value corresponding to a frequency of light pulses necessary to generate a particular bit error rate. Again referring to entry 305-1, a noise pulse frequency field 315 value of 1000 kHz for 100 ps light pulses corresponds to an average BER close to 1.0E-4. In some implementations, more accurate results may be generated by statistical modeling. For entry 305-7 (also relating to a 10GE live traffic link), a noise pulse frequency field 315 value of 1 kHz for 100 ps light pulses corresponds to a BER of 1.0E-7.

Protocol field 320 may include a value corresponding to a network protocol that may be tested. Similarly, bitrate field 325 may include a bitrate associated with the network protocol in field 320. As described above, bit error burst size field 330 may include a value corresponding to the number of bits damaged during each pulse of tight from high instantaneous power light source 230. BER field 335 may include a value corresponding to a bit error rate for injection into live traffic link 240.

Memory 215 may include a random access memory (RAM) or another type of dynamic storage device that may store information and instructions for execution by control processor 210. In other embodiments, memory 215 may include a ROM device or another type of static storage device that may store static information and/or instructions for use by control processor 210.

Upon receipt of particular and protocol/bitrate information, control processor 210 may retrieve the corresponding pulse width and pulse frequency values from noise pulse width field 310 and a noise pulse frequency field 315, respectively, in bit error generation table 300 in memory 15. In other implementations, control processor 210 may calculate the parameters for the bit error output signal based on the protocol/bitrate and BER information using an algorithm or other logic. Control processor 210 may use the retrieved (or calculated) pulse width and pulse frequency values to tune or configure high instantaneous power light source 230 to output corresponding light pulses having the selected width and frequency/interval.

In some implementations, the duration and frequency of tight pulses output by bit error generator 205 may be configured to mimic different error characteristics, such as error burstiness, error distribution, different types of errors, etc. For example, bit error generator 205 may receive a user selection of a desired error characteristic (e.g., burstiness), via input device 220, as well as any sub-characteristics associated with the selected characteristic, such as duration, etc. In response to this information (as well as the protocol and bitrate information), bit error generator 205 may instruct or cause high instantaneous power light source 230 to output light pulses that cause bit errors having the selected characteristic(s).

High instantaneous power light source 230 may include, for example, an erbium doped fiber tight source (i.e., a laser) that emits an output signal or output pulses in a broadband spectrum. In some embodiments, high instantaneous power light source 230 may include a distributed feedback (DFB) semiconductor laser or a vertical cavity surface emitting laser (VCSEL) that enables wavelength tuning through adjustments to a temperature of the laser device. In response to an instruction from control processor 210, high instantaneous power light source 230 may output one or more pulses of high instantaneous power light at a particular pulse width and frequency via output signal 255 (also referred to as bit error simulation signal 255).

In one implementation, the pulses of tight may have an optical power or intensity significantly higher than the power of the signals traveling in live traffic link 240. More specifically, the increased (relative) power of the light pulses output by high instantaneous power light source 230 may overpower or saturate receiver 250 configured to receive live traffic signals. In this manner, receiver 250 may be unable to accurately decode or process the live traffic signal during the pulses, thus creating the bit errors.

In some implementations, such as those described below in relation to FIG. 4, control processor 210 may receive feedback information from DUT 245 and/or receiver 250 for optimizing the length and frequency of light output by high instantaneous power light source 230.

Furthermore, in an exemplary implementation, high instantaneous power light source 230 may output signals in a range that includes C-band and L-band wavelengths (i.e., wavelengths between 1530 and 1625 nanometers (nm)) or wideband 1310 nm or 850 nm) wavelengths. The values associated with wavelengths emitted by high instantaneous power light source 230 listed above are exemplary only and high instantaneous power light source 230 may have other parameters based on the particular circumstances and/or optical path and/or device being tested, such as other wavelengths or optical signal properties. The wavelength of the noise source (e.g., high instantaneous power light source 230) and the wavelength of the live traffic signal should be selected to avoid unnecessary optical interference. To avoid such interference, the wavelength of the noise source may be tunable.

Optical coupler 235 may include a 2×1 optical coupler configured to inject bit error simulation signal 255 from bit error generator 205 into live traffic link 240 that enables output signal 255 to be joined with live traffic link 240. Live traffic link 240 may include one or more optical fibers configured to carry data signals (e.g., wavelength division multiplexing (WDM) signals). The data signals may be carried via a number of optical frequencies wavelengths (e.g., channels).

DUT 245 may include any optical component or group of optical components for which bit error or BER performance is to be observed or measured. Exemplary devices may include a connector, a connector pair, an optical switch, a length of optical fiber, an optical line card, an optical line terminal (OLT), an optical network terminal (ONT), an optical add-drop multiplexer (OADM), an optical amplifier, etc.

Receiver 250 may be any device configured to receive and/or process optical data signals, e.g., WDM signals. In some implementations, DUT 245 may include receiver 250. For example, OLTs, ONTs, ADMs, etc., include optical receivers that interpret and process optical signals upon receipt.

Performance monitoring module 252 may be coupled to receiver 250 (and/or DUT 245) and may be configured to monitor the performance of DUT 245 based on the injected bit errors or BER. For example, DUT 245/receiver 250 may be monitored to determine responsiveness to bit errors with different characteristics, such as BER, burstiness, error distribution, and type of error, etc.

In some implementations, performance monitoring module 252 may be coupled to bit error generator 205 via, a network interface or other suitable interface. In this manner, performance monitoring module 252 may receive bit error information regarding a particular test from bit error generator 205.

Figure 4:
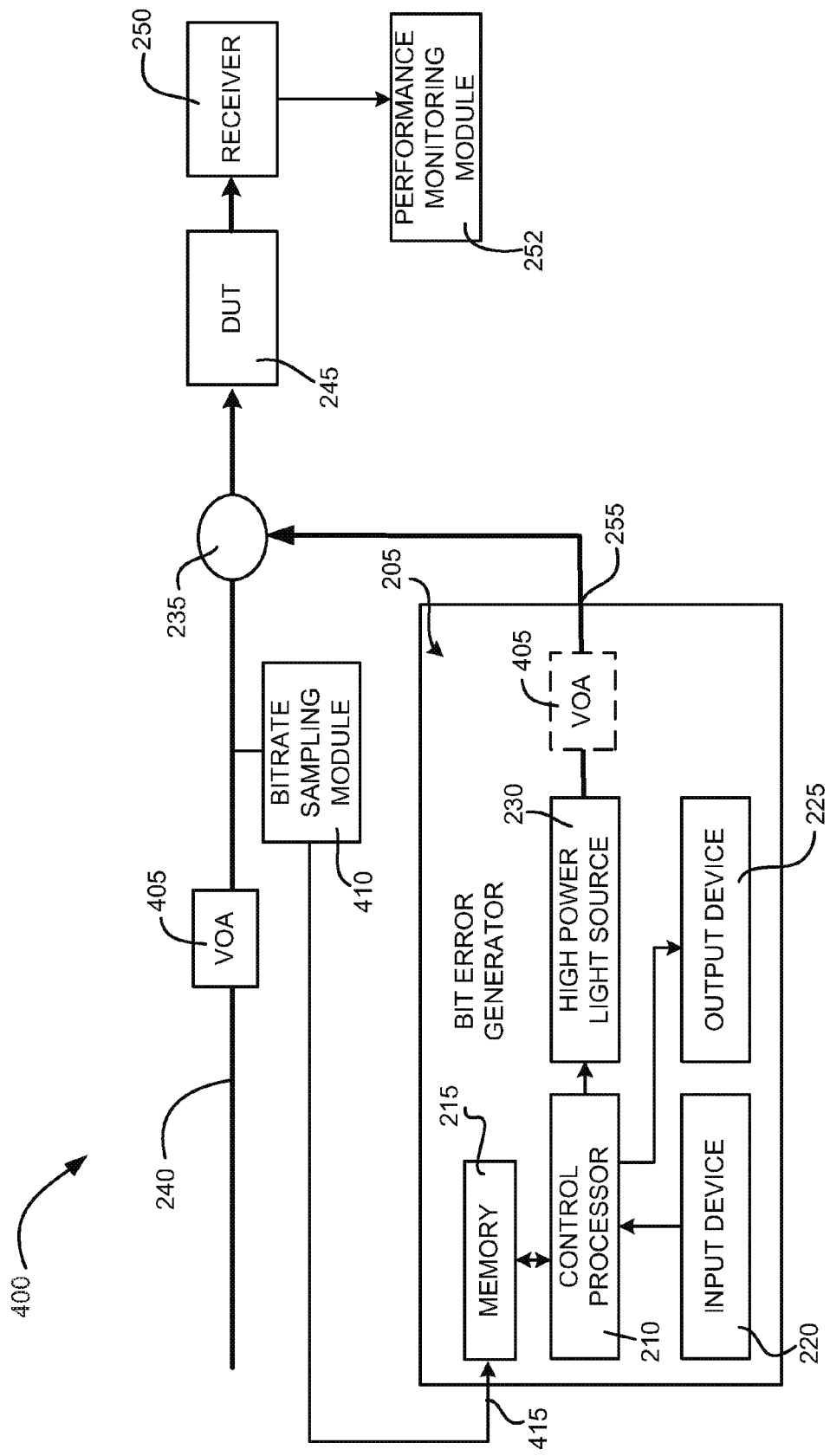
FIG. 4 is a block diagram of another exemplary configuration of a bit error simulation system consistent with implementations described here.

FIG. 4 is a block diagram of a portion of another exemplary BER simulation/generation system 400. The same reference numbers in FIG. 4 may identify the same or similar elements as set forth above in FIG. 2. In the embodiment of FIG. 4, BER simulation/generation system 400 may further include (n addition to components described in detail above a variable optical attenuator (VOA) 405, a bitrate sampling module 410, and a bitrate sampling input 415.

VOA 405 may be positioned upstream of optical coupler 235 in series with live traffic link 240 and may receive the live traffic data signal. VOA 405 may attenuate the power level of the received signal in a controlled manner to ensure that power of the traffic signal is significantly lower than the power of the high instantaneous intensity tight pulses generated by high instantaneous power light source 230.

In other implementations (indicated by dashed lines in FIG. 4), VOA 405 may be placed in series with bit error simulation signal 255 output from bit error generator 205. In such an implementation, VOA 405 may be configurable to attenuate the power level of the output signal 255 in a controlled manner to ensure that power of the light pulses is significantly higher than the power of the live traffic signal, but not high enough to damage receiver 250 and/or DUT 245. In some embodiments, VOA 405 may be configured via user interaction with bit error generator 205, such as via input 220 in bit error generator 205.

Bitrate sampling module 410 may include a component or device configured to monitor the live traffic signal(s) in live traffic link 240 and measure or calculate the bitrate of the traffic or data passing therethrough. For example, bitrate sampling module 410 may be used to differentiate between various bitrates like OC192 and 10GE. Bitrate sampling module 410 may be configured to monitor the bitrate in live traffic link 240 and provide this information to bit error generator 205. For example, control processor 210 in bit error generator 205 may be configured to receive the bit rate sampling information, and modify/adjust the duration and/or frequency of the output light pulses from high instantaneous power light source 230 based on the information.

Figure 5:
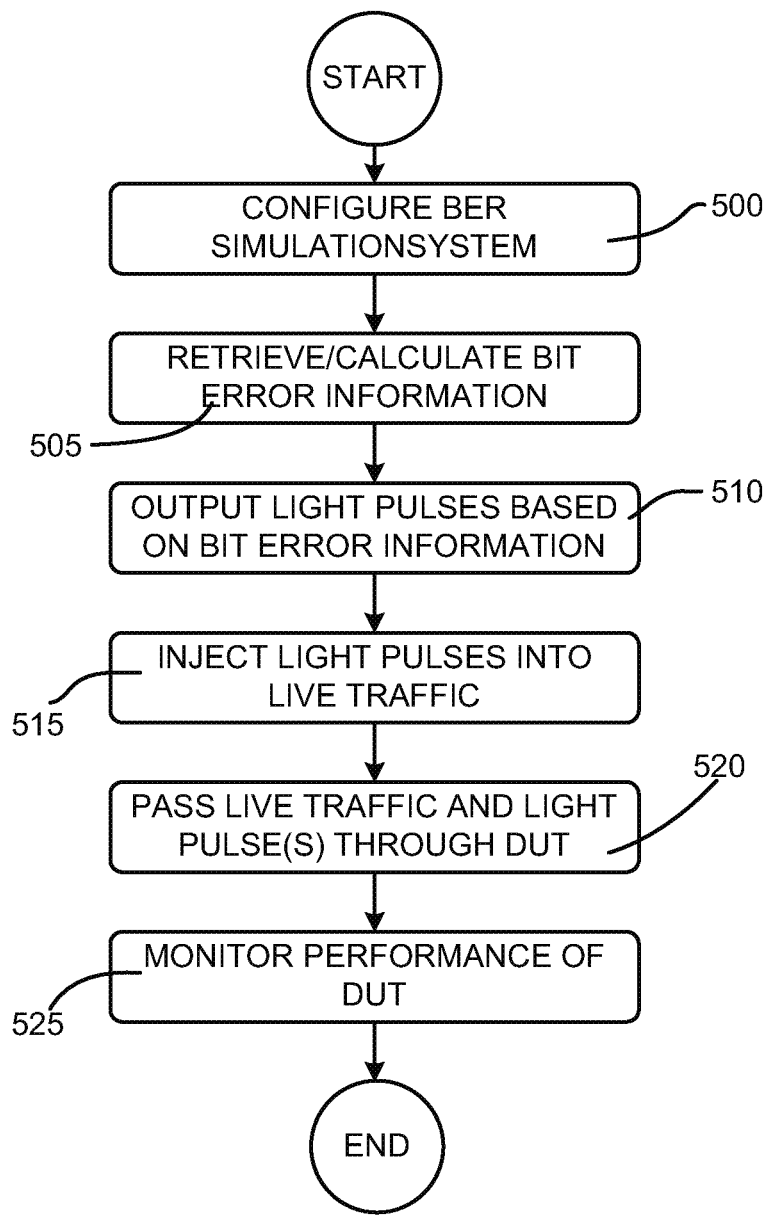
FIG. 5 is a flow diagram illustrating exemplary processing associated with a bit error simulation systems consistent with implementations described herein.

FIG. 5 is a flow diagram illustrating exemplary processing associated with BER simulation system 100 consistent with implementations described herein. Processing may begin by a technician configuring BER simulation system 200 (block 500). For example, processing may begin with the technician connecting optical coupler 235 to live traffic link 240 and/or DUT 245 and selecting a protocol and BER (or bit size) in bit error generator 205. As described above, in some implementations, the technician may also select one or more bit error characteristics.

For example, assume that the technician is testing an optical network terminal (ONT) device for its responsiveness to a BER of 10E-7 in a 10GE data signal. The desired BER of 10E-7 and the 10GE protocol may be input to bit error generator 205 via input device 220 (e.g., knobs, keypad, etc.). In some implementations, as described above, bit error generator 205 may be remotely configured via a network interface.

Once the bit error parameters have been established, control processor 210 may retrieve and/or calculate bit error information corresponding to the received parameters from memory 215 (block 505). For example, control processor 210 may perform a took-up in bit error generation table 300 based on the received parameters. Exemplary information may include pulse duration and pulse frequency information. In other implementations, retrieved information may include VOA tuning information, such as output power information. In still other implementations, sampled bitrate information relating to the live traffic signal may be received from bitrate sampling module 410. The information received from bitrate sampling module 410 may be used to adjust or fine tune the duration and frequency of the output light pulses to ensure accurate BER simulation.

Bit error generator 205 may cause high instantaneous power tight source 230 to output light pulses/bursts via output signal 255 based on the information retrieved from memory 215 and or bitrate sampling module 410 (block 510). The output light pulses may enter live traffic link 240 via optical coupler 235 (block 515). As described briefly above, in some embodiments, the output light pulses and/or the live traffic signal may be attenuated via VOA 405 to ensure that the optical power of the light pulses emitted by bit error generator 205 are significantly higher than the optical power of the live traffic signal.

The live traffic signal and light pulses may pass through DUT 245 and be received by receiver 250 (block 520). In instances where DUT 245 includes an optical receiver, no separate receiver 250 may be required. Because the optical power of the light pulses emitted by bit error generator 205 is significantly higher than the optical power of the live traffic signal (e.g., signal 240), receiver 250 becomes over saturated upon receipt of the light pulses, effectively preventing accurate reading and/or processing of the live traffic data received during the same period.

Performance monitoring module 252 may monitor the performance of DUT 245 based on the injected bit errors or BER (block 525). For example, DUT 245/receiver 250 may be monitored to determine responsiveness to bit errors with different characteristics, such as BER, burstiness, error distribution, and type of error, etc. As described above, in some implementations, performance monitoring module 252 may be coupled to bit error generator 205 via, a network interface or other suitable interface. In this manner, performance monitoring module 252 may receive bit error information regarding a particular test from bit error generator 205.

In the manner described above, bit errors in live traffic may be simulated to effectively ascertain the performance of a device or network in response to specifically defined bit error characteristics or BERs. For example, bit error generator 205 may be configured to output high instantaneous power light pulses fir specific durations and at specific intervals. The duration and intervals of the light pulses may be associated with the protocol/bitrate of a device or network being tested as well as the bit error characteristics being simulated. The light pulses may be injected into a live traffic signal destined for the device or network under test. The performance of the network or device under test may be monitored to ascertain the responsiveness of the device or network to the bit error condition and to allow better characterization of network performance. For example, on a protected Ethernet link between two devices, the desired behavior is that errored link be taken out of service so that traffic only goes across the working link. In many cases Ethernet will leave an errored link in service, causing service degradation. By testing the DUT with the injection of bit errors, solutions to this problem can be evaluated for their effectiveness.

Bit error simulations performed in the manner described above are valuable to service providers that need to test equipment interconnected over serial fiber networks, as well as the manufacturers of such equipment or test equipment vendors. The systems and devices described above are able to perform the bit error simulation entirely within the optical domain, thereby eliminating computationally expensive processing in the electrical domain.

The foregoing description of exemplary implementations provides illustration and description, but is not intended to be exhaustive or to limit the embodiments to the precise form disclosed. Modifications and variations are possible in light of the above teachings or may be acquired from practice of the embodiments.

In addition, while series of acts have been described with respect to FIG. 5, the order of the acts may be varied in other implementations. Moreover, non-dependent acts may be implemented in parallel.

It will be apparent that various features described above may be implemented in many different forms of software, firmware, and hardware in the implementations illustrated in the figures. The actual software code or specialized control hardware used to implement the various features is not limiting. Thus, the operation and behavior of the features were described without reference to the specific software code—it being understood that one of ordinary skill in the art would be able to design software and control hardware to implement the various features based on the description herein.

Further, certain portions of the invention may be implemented as "logic" that performs one or more functions. This logic may include hardware, such as one or more processors, microprocessor, application specific integrated circuits, field programmable gate arrays or other processing logic, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Further, the phrase "based on" is intended to mean "based, at least in part, on" unless explicitly stated otherwise.

What is claimed is:

1. A bit error generating device, comprising:
a light source;
an input device; and
a control processor that includes logic configured to:
receive protocol or bitrate information regarding a live traffic signal via the input device;
determine bit error simulation signal parameters based on the received protocol or bitrate information;
configure the light source to generate the hit error simulation signal based on the hit error simulation signal parameters; and
instruct the light source to inject the bit error simulation signal into an optical fiber carrying the live traffic signal.

2. The device of claim 1, wherein the bit error simulation signal comprises one or more pulses of high instantaneous power light emitted by the light source.

3. The device of claim 1, wherein the input device comprises a network interface for receiving instructions or information from a remote device.

4. The device of claim 3, wherein the remote device comprises a performance monitoring device connected to a second device that receives the live traffic signal, and
wherein the control processor is further configured to:
transmit at least some of the bit error simulation signal parameters to the performance monitoring device for use in monitoring a performance of the second device.

5. The device of claim 1,
wherein the control processor is further configured to:
receive bit error characteristic information via the input device; and
configure the light source based on the protocol or bitrate information and the bit error characteristic information.

6. The device of claim 5, wherein the bit error characteristic information is received from a user of the device.

7. The device of claim 5, wherein the bit error characteristic information comprises at least one of a bit error rate (BER) or a bit error burst size.

8. The device of claim 1, wherein the hit error simulation signal is configured to simulate one or more of a particular bit error size, a particular bit error rate (BER), a particular bit error type, a particular bit error burstiness, or a particular bit error distribution in the live traffic signal upon injection of the bit error simulation signal.

9. The device of claim 1, wherein the bit error simulation signal parameters comprise a duration of at least one high instantaneous power light pulse.

10. The device of claim 9, wherein the bit error simulation signal parameters further comprise an interval between more than one high instantaneous power light pulses.

11. The device of claim 1, further comprising:
a variable optical attenuator configured to maintain an optical power of the bit error simulation signal substantially higher than an optical power of the live traffic signal.

12. A method, comprising:
- receiving protocol or bitrate information regarding a live traffic signal;
- determining bit error simulation signal parameters based on the received protocol or bitrate information;
- generating, via a high instantaneous power light source, a bit error simulation signal based on the bit error simulation signal parameters; and
- injecting the bit error simulation signal into an optical fiber carrying the live traffic signal.

13. The method of claim 12, wherein the bit error simulation signal comprises one or more pulses of high instantaneous power light emitted by the high instantaneous power light source.

14. The method of claim 12, further comprising:
- outputting the live traffic signal with the injected bit error simulation signal to a device under test monitored by a performance monitor.

15. The method of claim 14, further comprising:
- transmit at least some of the bit error simulation signal parameters to the performance monitoring device for use in monitoring a performance of the device under test.

16. The method of claim 12, further comprising:
- receiving bit error characteristic information from a user; and
- configuring an output of the high instantaneous power light source based on the protocol or bitrate information and the bit error characteristic information.

17. The method of claim 16, wherein the bit error characteristic information comprises at least one of a bit error rate (BER) or a bit error burst size.

18. The method of claim 12, wherein the bit error simulation signal is configured to simulate one or more of a particular bit error size, a particular bit error rate (BER), a particular bit error type, a particular bit error burstiness, or a particular bit error distribution in the live traffic signal upon injection of the bit error simulation signal.

19. A device, comprising:
- a light source;
- an input device; and
- a control processor that includes logic configured to:
  - cause the light source to inject a bit error simulation signal into an optical fiber carrying a traffic signal via a known protocol,
  - wherein the bit error simulation signal comprises at least one high instantaneous power light pulse output by the light source and configured to simulate a bit error condition; and
  - cause an optical attenuator to attenuate the bit error simulation signal to maintain an optical power of the bit error simulation signal substantially higher than an optical power of the traffic signal.

20. The device of claim 19, wherein the control processor is further configured to:
- receive protocol or bitrate information regarding a traffic signal via the input device;
- determine bit error simulation signal parameters based on the received protocol or bitrate information; and
- configure the bit error simulation signal based on the bit error simulation signal parameters.

* * * * *